Patented May 12, 1931

1,805,431

UNITED STATES PATENT OFFICE

CARROLL D. RYDER, OF DANBURY, CONNECTICUT

COMPOSITION FOR THE MANUFACTURE OF CONDUITS AND THE LIKE

No Drawing.    Application filed January 25, 1928.   Serial No. 249,497.

This invention relates to compositions for the manufacture of conduits and the like, especially for use as sewers, culverts, water and drain pipes, and particularly a composition having for its object to provide a conduit having relatively greater strength and density than conduits heretofore manufactured, and which may be made lighter in weight and structure by reason of such increased strength. The present application is a continuation in part of my application for conduit, Ser. No. 162,415, filed January 20, 1927.

Heretofore commercial concrete consisted of sand, gravel and cement, which because of the irregular size and shape of the gravel, its smooth surface, and the granular nature of the sand, produced a relatively porous, non-homogeneous mixture which depended for its strength upon bulk, rather than upon its inherent structure. According to the present invention it is proposed to provide a composition of a substantially non-porous, homogeneous nature, in which substances are employed having both a structural and natural affinity for each other, resulting in a solid tenacious mass. A further object is to produce a composition of uniform structure by providing ingredients that may be processed and graded to render them uniform, as distinguished from sand and gravel, which vary in structure and size in different localities.

To this end I propose to provide a composition composed of cement and limestone aggregate, the latter consisting of relatively coarse limestone particles and relatively finely ground limestone. I am aware that compositions have heretofore been produced in which cinders, both coarse and fine, have been employed as an aggregate, but these were porous and had a relatively lower crushing and breaking strength than concrete employing gravel and sand aggregate, and were therefore entirely unsuitable for uses requiring strength and non-porosity, such as in conduits and sewers. Also, I am aware that limestone has heretofore been employed in concrete compositions in combination with a sand agregate. The tenacious, homogeneous structure of my composition is characterized by the fact that fractures resulting from loading to the point of failure or breakage are entirely trans-fragmentary, as distinguished from concrete compositions employing gravel and sand aggregate, in which particles of the aggregate partially pull out of the bed upon fracture.

In carrying out my invention I mix an aggregate of coarse limestone particles, and finely ground limestone, in about equal proportions, with cement, the proportion of the limestone aggregate to the cement being about three to one. This mixture is poured in a semi-wet state, or what is known in the industry as a dry pour, into suitable pipe molds, and may be tamped or not, depending upon the particular requirements. The peculiarly tenacious and homogeneous nature of the composition is such that the molds may be almost immediately removed after pouring, and the pipe moved to an airing room, without danger of breakage or fracture, thereby permitting the repeated use of the molds during airing of the pipe. In the airing room it is steamed and sprayed and allowed to dry and set. I have found that the coarse limestone particles, having uneven and rough surfaces, and the finely ground limestone, have a structural and natural affinity, the powdered limestone being drawn into all of the crevasses and irregularities of the coarse particles, thereby intimately combining therewith and forming an interlocking relatively non-porous, and homogeneous mass. This structure, in addition to being non-porous, is particularly suited to the stresses and strains set up in pipe structures, this being due in part to the peculiarly tenacious and homogeneous composition, and in part to the irregular shape of the coarse limestone particles, which in the combined mass present an infinite number of closely related and interlocked strains resisting areas extending in all directions.

For this reason it is possible to produce non-reinforced pipe with my composition, which will be equal in strength to metal reinforced pipe employing the usual gravel and sand aggregate, and which will have the added advantage of decreased weight and wall thickness. It will be understood of course, that the invention is not limited to the production of non-reinforced pipe.

While approximately the relative proportions herein set forth are preferably employed under ordinary conditions and circumstances, suitable variations may be made in the proportions, according to the nature of the work and the circumstances under which it is constructed. I therefore do not limit myself to the precise proportions herein set forth, but preserve the right to all such variations and proportions as properly fall within the spirit and scope of my invention.

Having thus described my invention, what I claim, and desire to secure by Letters Patent is:—

1. A fluid carrying molded conduit, composed of a pouring composition comprising a mixture composed wholly of a sand-free aggregate of coarsely broken limestone particles having rough uneven surfaces and fine limestone particles of powdery consistency having a structural and natural affinity for said coarse particles, cement, and water acting as a mixing agent, said powdered limestone adapted to enter into solid, homogeneous interlocked relation with the rough uneven surface of the coarse limestone particles, whereby a non-porous conduit is produced in which fracture will be trans-fragmentary as respects said coarse limestone particles.

2. A fluid carrying molded conduit, composed of a pouring composition comprising a mixture composed wholly of a sand-free aggregate of coarsely broken limestone particles having rough uneven surfaces and fine limestone particles of powdery consistency having a structural and natural affinity for said coarse particles, said coarse and fine limestone being in substantially equal proportions, cement in substantially the proportion of one to three to said limestone, and water acting as a mixing agent, said powdered limestone adapted to enter into solid, homogeneous interlocked relation with the rough uneven surface of the coarse limestone particles, whereby a non-porous conduit is produced in which fracture will be trans-fragmentary as respects said coarse limestone particles.

Signed at Bridgeport, in the county of Fairfield, and State of Connecticut, this 22nd day of December, 1927.

CARROLL D. RYDER.